(No Model.) 2 Sheets—Sheet 1.

W. OSMENT.
APPARATUS FOR PRODUCING RAISED PANELS AND MOLDINGS ON SQUARE BALUSTERS, &c.

No. 569,029. Patented Oct. 6, 1896.

WITNESSES.
Ho. van Oldenneel
E. A. Scott.

INVENTOR.
William Osment
by Richardson
Attorneys

THE NORRIS PETERS CO., PHOTO-LITHO., WASHINGTON, D. C.

(No Model.) 2 Sheets—Sheet 2.
W. OSMENT.
APPARATUS FOR PRODUCING RAISED PANELS AND MOLDINGS ON SQUARE BALUSTERS, &c.
No. 569,029. Patented Oct. 6, 1896.
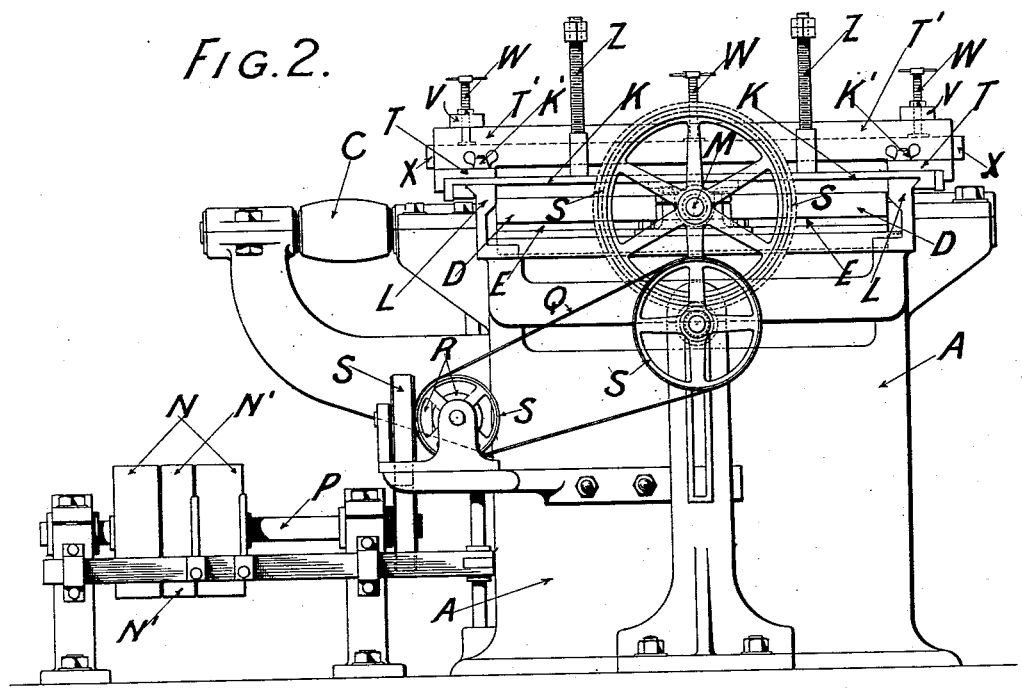
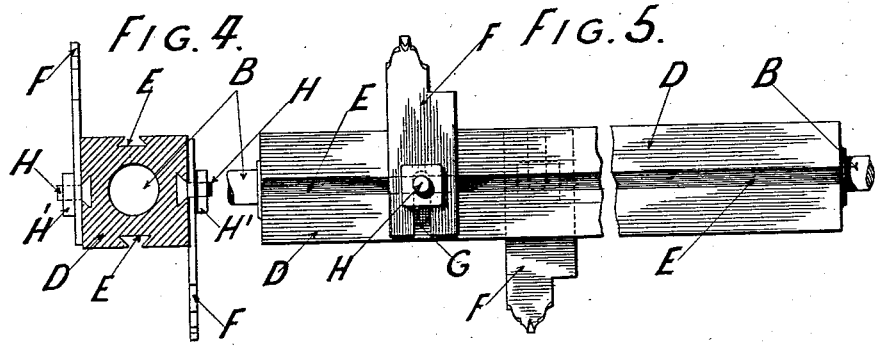
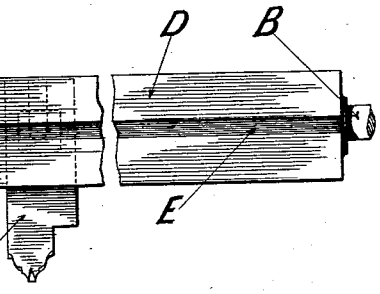
WITNESSES.
H. van Heemel
E. A. Scott
INVENTOR.
William Osment
by Richardson
Attorneys
THE NORRIS PETERS CO., PHOTO-LITHO., WASHINGTON, D. C.

UNITED STATES PATENT OFFICE.

WILLIAM OSMENT, OF LONDON, ENGLAND.

APPARATUS FOR PRODUCING RAISED PANELS AND MOLDINGS ON SQUARE BALUSTERS, &c.

SPECIFICATION forming part of Letters Patent No. 569,029, dated October 6, 1896.

Application filed December 3, 1895. Serial No. 570,876. (No model.) Patented in England February 8, 1895, No. 2,800; in Belgium November 7, 1895, No. 118,212, and in France November 7, 1895, No. 251,518.

*To all whom it may concern:*

Be it known that I, WILLIAM OSMENT, a subject of the Queen of Great Britain and Ireland, and a resident of London, England, have invented a certain new and useful Improved Apparatus for Producing Raised Panels and Moldings on Square Balusters and the Like, (for which I have obtained patents in the following countries, to wit: Great Britain, No. 2,800, dated February 8, 1895; Belgium, No. 118,212, dated November 7, 1895, and France, No. 251,518, dated November 7, 1895,) of which the following is a specification.

The object of my invention is to provide a very efficient apparatus for producing raised panels by creating the desired bevels or grooves or other similar devices on their surfaces and for producing moldings on square balusters and the like in a very rapid but extremely sure and exact manner. I carry out this object by rigidly holding the panels, balusters, or the like on a table or in a frame secured on the table, and causing this table to travel over or under or between rapidly-revolving cutters, by which the under sides or the upper sides or both sides of the articles are treated in the required manner, and then the articles can be released, turned over, and again rigidly held on the table or in the frame, and another face or other faces thereof can be treated, and so on, as will now be exactly and particularly described.

Figure 1:
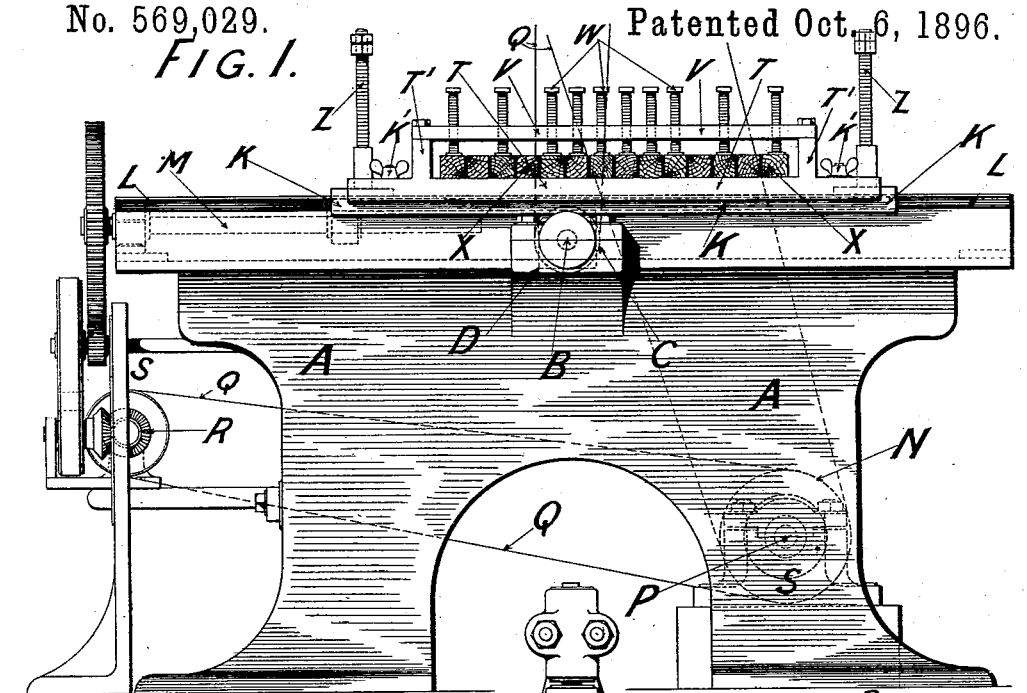
Figure 3:
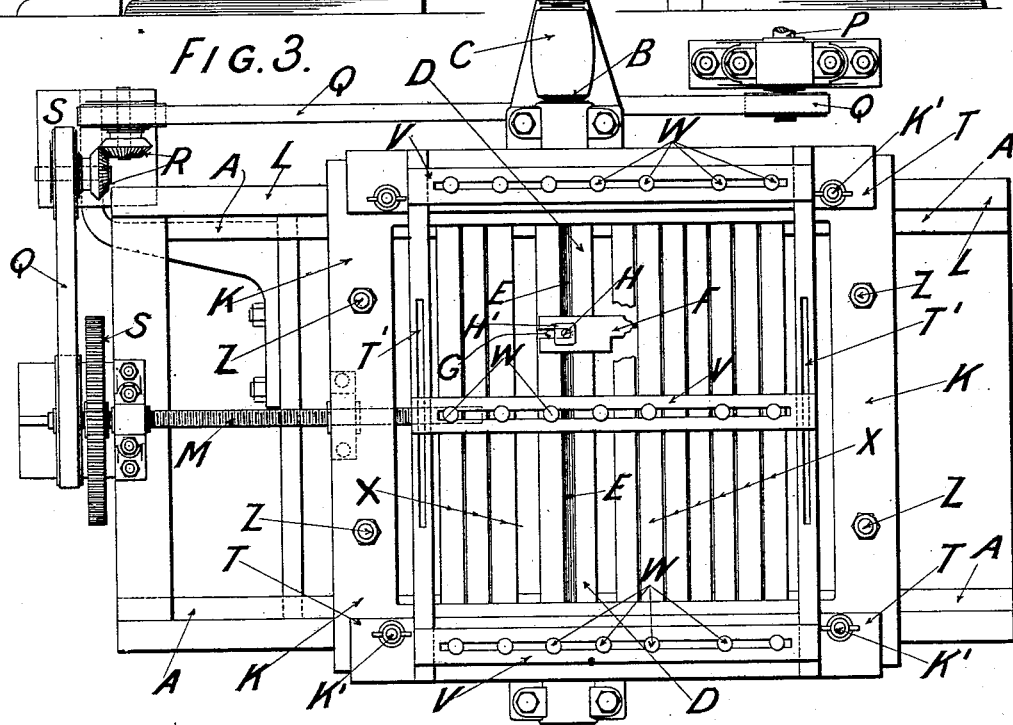

In the accompanying drawings I have shown the apparatus as arranged for treating small square balusters, and Figure 1 is a side elevation, Fig. 2 is an end elevation, and Fig. 3 is a plan, of the apparatus so arranged. Figs. 4 and 5 are a section and an elevation, on an enlarged scale, of a cutter-spindle with cutters thereupon.

A bench A is made in any usual manner of the desired dimensions, having regard to the articles that are to be treated in and by this apparatus, and on this bench A is transversely mounted in suitable bearings a horizontal or other spindle B, which can be revolved through a pulley C by any power, at any desired speed, and in the desired direction. On this spindle B are adjustably secured in any usual manner the desired number of cutters, and I show in Figs. 4 and 5 a very convenient method of forming and fitting the spindle and the cutters. The central part D of the spindle B is enlarged and made of a square or oblong shape in section, or this central part D may be a separate boss or sleeve passed over the spindle B and secured thereto, and along each face of the part D, and preferably along the central line thereof, is made an undercut groove E, which can extend the whole length of the same from bearing to bearing of the spindle B. A cutter F is made in any ordinary style and with a proper shape or profile of cutting edge to produce the desired moldings or other devices, and in the shank of this cutter F is made a longitudinal slot G, wherethrough passes the tail of a bolt H, the head whereof is held in the groove E, and a screw-nut H' on the tail of the bolt H can rigidly clamp the cutter F in position, whether in the length of the groove E, and in the distance its cutting edge projects from the spindle B. Any number of these cutters F can be similarly secured on the same or different faces of the part D of the spindle B, as may be desired in each case.

At the necessary elevation over the spindle B is mounted a traveling table K, with the required large central aperture or apertures, which table K can slide on and be held by longitudinal V-shaped guides L, fitted on the bench A. This table K can be caused to travel by a long screwed rod M, mounted in suitable bearings, preferably along the central longitudinal line of the bench A and engaged, as is customary, with the table K, and this rod M can be revolved when desired by any power, at any desired speed, and preferably in either direction—it may be through the usual three fast and loose pulleys N and N', mounted, as is customary, on a short shaft P, which can be connected with the rod M by bands Q, bevel-wheels R, and pulleys and geared wheels S. It may be convenient also to form certain of the pulleys S wherearound the bands Q pass as cones, so that the speed of revolution of the rod M can be varied in respect of that of the shaft P. Any other ordinary appliances can also, when desired, be used to revolve the rod M.

On the table K can be secured a frame T by any ordinary contrivances, such, for example, as the butterfly-nuts K' on suitable bolts, in such a manner that while this frame T can be very rigidly and quickly secured on the table K it can also be very easily and quickly released and detached therefrom; and this frame T is made of the proper size and shape, and is so fitted with such devices as to be capable of rigidly holding the articles that are to be treated. When these articles are small square balusters, the transverse members T' of the frame T can be elevated, and thereon can be secured a number of longitudinal clamping-bars V, through which can pass a number of screw or other bolts W, whereby the balusters X can be rigidly held in position in this frame T.

Any number of bars V may be provided, having regard to the length and strength of the balusters X and the number of places in which they are to be treated by the cutters F and in which they require support; and these bars V, and especially the central bar or bars V, are preferably so fitted as to be capable of being moved along the members T' and secured thereon where they are needed.

The balusters X are placed in the frame T in whatever positions they are required, having regard to the moldings that are to be produced and the directions thereof, generally, perhaps, as shown, transversely across the bench A and side by side in close juxtaposition, and a bolt W can be provided for each baluster X or otherwise, as may be preferred. It is very convenient to make in the frame T such slots or recesses or other ordinary devices as will insure that each baluster X, when it has been removed and it may be turned over, can invariably be exactly replaced in precisely the same position.

The action of this apparatus and the method of working and using the same are as follows: The required number of cutters F, each of which has a cutting edge of the desired profile, are properly secured on the spindle B in the necessary positions, and the required number of balusters X, each of which is of the desired shape and size, are properly secured in the frame T in the necessary positions, which frame T is rigidly secured on the table K. The spindle B and the rod M are then revolved in the desired directions at the desired speeds, causing the table K to travel over the revolving cutters F, when the under sides of all the balusters X will be similarly treated, and the required moldings will be produced on one face or side of each baluster X. The balusters X can then be released, turned over, and again properly secured in the frame T, and the rod M can be revolved in the opposite direction, causing the table K to travel back again over the revolving cutters F, which can also, if desired, be revolved in the opposite direction, when in the same manner the required moldings will be produced on one other face or side of each baluster X, and so on until all the faces or sides of each baluster have been similarly treated. When desired, also, after one face or side of each baluster has been thus treated, the frame T can quickly be released from the table K and inverted, and then the under sides of all the balusters so treated can be sandpapered or otherwise finished off *in situ* The frame T can then again be quickly secured on the table K, the balusters are released, turned over, and the action proceeds as is aforesaid. When the balusters are too large to pass under the bars V, similar longitudinal clamping-bars can be fitted on the tall standards Z, erected on the table K, which clamping-bars may be provided with bolts similar to the bolts W, or may themselves be screwed down on the standards Z by nuts, as shown, to rigidly hold the balusters in position, and in this case the frame T can, if desired, be removed.

The balusters may in cross-section be of a square, triangular, sexagonal, octagonal, or other shape, having plane sides, and each of these sides can be similarly treated.

When raised panels are to be produced by creating the desired bevels or grooves or other similar devices on their surfaces, a similar course of procedure is followed, and the panels are similarly held in a suitable frame or on a traveling table, and the table is similarly caused to travel, when the under sides of the panels will be similarly and properly treated, as may be desired, by appropriate revolving cutters. The panels can then, if desired, similarly be sandpapered or otherwise finished off *in situ*, and can similarly be released, turned over, and the action can proceed as is aforesaid.

In the same manner other articles of a like nature and shape having plane sides can obviously be treated.

Having now described my invention, what I claim as new, and desire to secure by Letters Patent, is—

1. A bench A, a revoluble spindle B mounted transversely on the bench A, and cutters F adjustably secured on the spindle B, in combination with a traveling table K mounted on the bench A, a revoluble screwed rod M mounted longitudinally on the bench A and engaged with the table K, and a frame T detachably secured on the table K, means being provided for rigidly holding panels, balusters and the like in the frame T, and for revolving the spindle B and the rod M, substantially as described, for the purpose specified.

2. The combination with a bench A, carrying a transverse revoluble spindle B, provided with adjustable cutters F, and a longitudinally-traveling table K, actuated by a longitudinal revoluble screwed rod M, of a frame T detachably secured on the table K, and provided with longitudinal clamping-bars V and bolts W, means being provided for revolving the spindle B and the rod M, substantially as described for the purposes specified.

In witness whereof I have hereunto set my hand in presence of two witnesses.

WILLIAM OSMENT.

Witnesses:
 JAS. HART,
 FRED. JONES.